United States Patent
Inglis et al.

(10) Patent No.: US 11,555,376 B2
(45) Date of Patent: Jan. 17, 2023

(54) BALL VALVES, METHODS TO CLOSE A BALL VALVE, AND METHODS TO FORM A WELL BARRIER

(71) Applicant: Halliburton Energy Services, Inc., Houston, TX (US)

(72) Inventors: Peter DW Inglis, Dundee (GB); Katherine Ann Davies, Camoustie (GB)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/118,250

(22) Filed: Dec. 10, 2020

(65) Prior Publication Data

US 2021/0348479 A1   Nov. 11, 2021

Related U.S. Application Data

(60) Provisional application No. 63/020,364, filed on May 5, 2020.

(51) Int. Cl.
    *E21B 34/14*      (2006.01)
    *F16K 5/06*       (2006.01)
    (Continued)

(52) U.S. Cl.
    CPC .......... *E21B 34/142* (2020.05); *E21B 34/063* (2013.01); *F16K 5/0605* (2013.01);
    (Continued)

(58) Field of Classification Search
    CPC .. E21B 34/142; E21B 34/063; E21B 2200/04; F16K 5/0605; F16K 5/0647; F16K 31/563
    See application file for complete search history.

(56) References Cited

U.S. PATENT DOCUMENTS

| | | | |
|---|---|---|---|
| 4,550,780 A | 11/1985 | Mott | |
| 2010/0300702 A1* | 12/2010 | Andrews | E21B 34/14 166/373 |

(Continued)

FOREIGN PATENT DOCUMENTS

| | | |
|---|---|---|
| CN | 101868594 A | 10/2010 |
| EP | 0753646 B1 | 2/2003 |
| WO | 9705362 A1 | 2/1997 |

OTHER PUBLICATIONS

International Search Report and Written Opinion dated May 5, 2020, issued in related International Application No. PCT/US2020/066183.

*Primary Examiner* — Christopher J Sebesta
(74) *Attorney, Agent, or Firm* — McGuireWoods LLP

(57) ABSTRACT

Ball valves, methods to close a ball valve, and methods to form a well barrier are discussed. A ball valve includes a valve housing and a ball that is rotatably movable from an open position to a closed position. The ball valve also includes an actuation mechanism operable to rotate the ball from the open position to the closed position, where a fluid passage of the ball is not aligned with a fluid passage of the valve housing while the ball is in the closed position. The ball valve further includes a sleeve disposed in the valve housing and operable to shift from a first position to a second position to actuate the actuation mechanism.

19 Claims, 4 Drawing Sheets

(51) Int. Cl.
*F16K 31/56* (2006.01)
*E21B 34/06* (2006.01)
(52) U.S. Cl.
CPC .......... *F16K 5/0647* (2013.01); *F16K 31/563* (2013.01); *E21B 2200/04* (2020.05)

(56) References Cited

U.S. PATENT DOCUMENTS

| | | | | |
|---|---|---|---|---|
| 2013/0082202 | A1* | 4/2013 | Morrison | E21B 33/14 251/315.01 |
| 2013/0299183 | A1* | 11/2013 | Williams | F16K 17/32 166/373 |
| 2015/0083434 | A1* | 3/2015 | Wind | E21B 34/08 166/373 |
| 2016/0003005 | A1* | 1/2016 | Pickle | E21B 34/10 166/374 |
| 2017/0234109 | A1* | 8/2017 | Smith | E21B 34/14 166/331 |
| 2017/0342800 | A1* | 11/2017 | Themig | E21B 33/146 |

* cited by examiner

BALL VALVES, METHODS TO CLOSE A BALL VALVE, AND METHODS TO FORM A WELL BARRIER

BACKGROUND

The present disclosure relates generally to ball valves, methods to close a ball valve, and methods to form a well barrier.

Wellbores are sometimes drilled into subterranean formations to allow for the extraction of hydrocarbons and other materials. Valves are sometimes disposed in a wellbore and are utilized during one or more well operations to restrict fluid flow through the wellbore.

BRIEF DESCRIPTION OF THE DRAWINGS

Illustrative embodiments of the present disclosure are described in detail below with reference to the attached drawing figures, which are incorporated by reference herein, and wherein.

Figure 1:
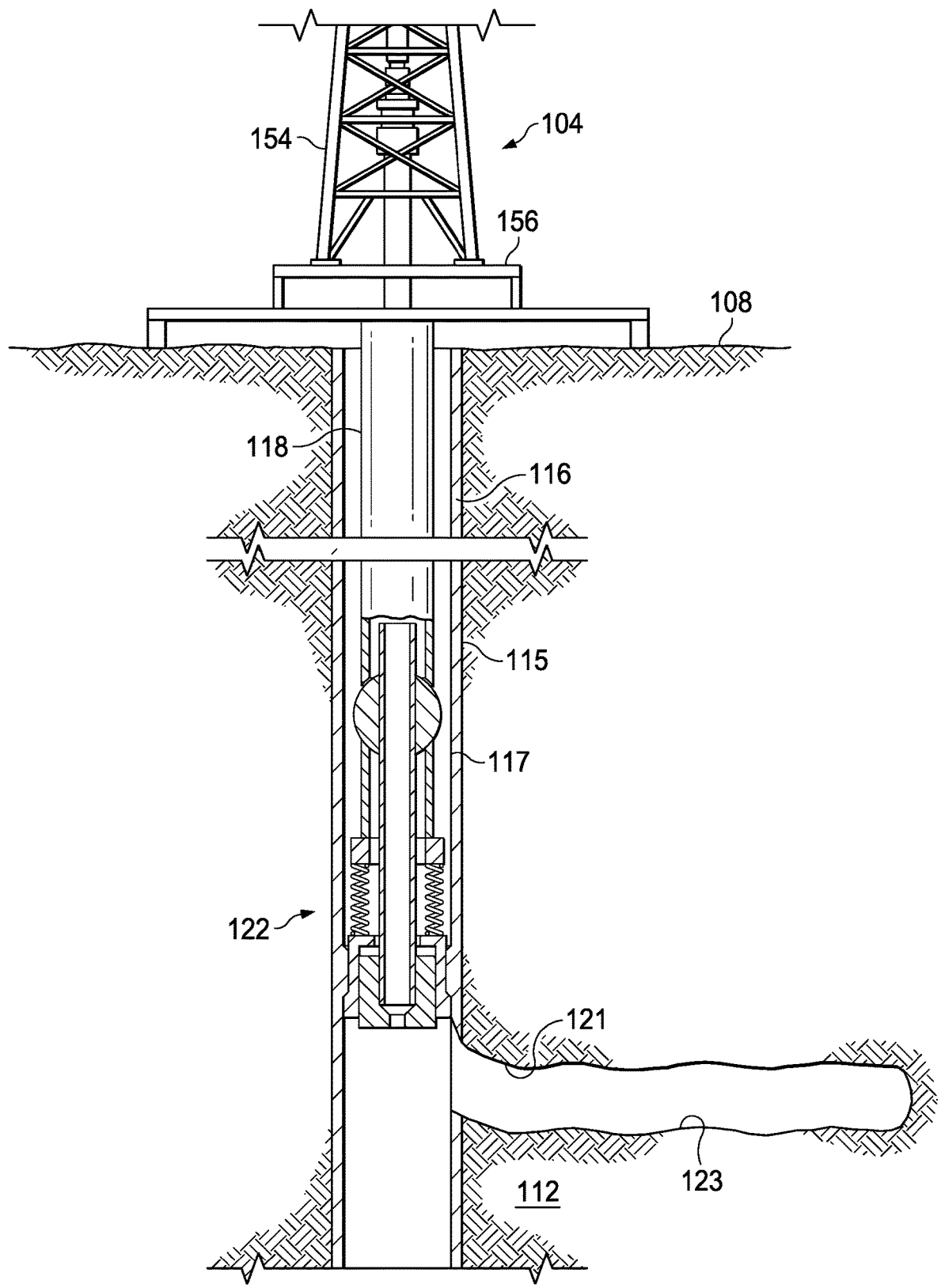
FIG. 1 shows an example of a wellbore operating environment in which a ball valve is deployed.

The illustrated figures are only exemplary and are not intended to assert or imply any limitation with regard to the environment, architecture, design, or process in which different embodiments may be implemented.

DETAILED DESCRIPTION

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to ball valves, methods to close a ball valve, and methods to form a well barrier. A ball valve has a ball and a valve housing, each having an interior fluid passage. The ball is rotatably movable from an open position to a closed position. The fluid passages of the ball and the valve housing are aligned when the ball is in the open position to permit fluid flow through the ball valve. Further, the fluid passages of the ball and the valve housing are not aligned when the ball is in the closed position to reduce or restrict fluid flow through the ball valve. The ball valve has an actuation mechanism that, when actuated, rotates the ball from the open position to the closed position to reduce or restrict fluid flow through the ball valve.

The ball valve also has a shiftable sleeve which, when shifted from a first position to a second position, actuates the actuation mechanism, which in turn shifts the ball from the open position to the closed position. In some embodiments, the sliding sleeve includes or is coupled to a diverter seat that is configured to catch a diverter flowing downhole, where the force of the diverter landing on the diverter seat shifts the sleeve from the first position to the second position. As referred to herein, downhole refers to a direction along a wellbore that is away from the surface end of wellbore, whereas uphole refers to a direction along the wellbore that is towards the surface end of wellbore. Further, as referred to herein, a diverter seat is any device configured to catch or retain a diverter, whereas a diverter is any device configured to engage the diverter seat to shift the sleeve. Examples of diverter seats include, but are not limited to, ball seats, dart seats, and plug seats, whereas examples of diverters include, but are not limited to, balls, darts, and plugs that are deployable in the valve housing. In some embodiments, the diverter seat includes or is coupled to a shearable piece that initially prevents movement of the sleeve. As referred to herein, a shearable piece refers to any object configured to shear in response to a threshold amount of force or pressure applied to the object. Examples of shearable pieces include, but are not limited to, shear pins, shear screws, and other types of objects configured to shear in response to a threshold amount of force or pressure applied to the object. In some embodiments, the force or pressure generated by the diverter landing on the diverter seat shears the shearable piece, and shifts the sleeve from the first position to the second position. In some embodiments, where a diverter is not flown into the diverter seat, electrical, mechanical, electromechanical, or hydraulic force or pressure is applied to shear the shearable piece and to shift the sleeve from the first position to the second position. In some embodiments, the sleeve includes or is coupled to a collet that initially prevents movement of the sleeve. Further, the collet is configured to collapse in response to a threshold amount of force or pressure applied to the collet to release the sleeve.

In some embodiments, the actuation mechanism includes a latch that is engaged to a latch retainer, and a spring that is coupled to the latch and initially held in a compressed state while the latch is engaged to the latch retainer. Further, the sleeve disengages the latch from the latch retainer as the sleeve shifts from the first position to the second position, thereby allowing the spring to return to a natural state. Further, the force of the spring returning from to the natural state shifts the ball from the open position to the closed position. In one or more of such embodiments, the spring is coupled to an arm, which in turn is coupled to the ball. In one or more of such embodiments, force generated by the spring returning to the natural state shifts the arm which in turn rotates the ball from the open position to the closed position.

In some embodiments, the ball valve has a retaining mechanism that is initially engaged to the spring while the sleeve is in the first position to prevent actuation of the actuation mechanism. As referred to herein, a retaining mechanism is any mechanism that is configured to prevent the spring from returning to the natural state. Examples of the retaining mechanism include, but are not limited to, snap rings, collets, shear screws, or another member or device configured to initially prevent the spring to return to the natural state. In some embodiments, the ball valve also has a ball seat that is disposed near or coupled to the ball. Further, after the ball rotates to the closed position, the surfaces of the ball seat and the ball together form a fluid seal that reduces or restricts fluids from flowing through the ball. Additional descriptions of the ball valve, methods to close a ball valve, and methods to form a well barrier are provided in the paragraphs below and are illustrated in FIGS. 1-5.

Referring now to the drawings, FIG. 1 shows an example of a wellbore operating environment in which a ball valve 122 is deployed. In the illustrative embodiment, the operating environment includes a rig 104 positioned on the earth's surface 108 and extending over and around a wellbore 116. In some embodiments, rig 104 is a workover or drilling rig. Wellbore 116 extends into a subterranean formation 112 that has been formed for the purpose of recovering hydrocarbons. Wellbore 116 extends away from surface 108 over a vertical portion 115, deviates from a vertical over a deviated portion 121, and transitions to a path that approximately parallels surface 108 over a horizontal portion 123. In the embodiment of FIG. 1, vertical portion 115 is partially cased by casing 117, which in some embodiments, also extend through horizontal portion 123. In alternative operating environments, all or portions of a wellbore are vertical, deviated at any suitable angle, horizontal, and/or curved. Wellbore 116 may be a new wellbore, an existing wellbore, a straight wellbore, an extended reach wellbore, a sidetracked wellbore, a multi-lateral wellbore, and other types of wellbores for drilling and completing one or more production zones. Further, wellbore 116 is used for both producing wells and injection wells.

A conveyance, shown as tubular 118, includes ball valve 122 and is lowered into the subterranean formation 112 for a variety of workover or treatment procedures throughout the life of the well. In the embodiment of FIG. 1, tubular 118 is illustrated as a production tubing string having ball valve 122. As referred to herein, a conveyance includes any type of tubing string that is deployable into a wellbore. For example, the tubing string includes (without limitation) drill pipe, casing, rod strings, and coiled tubing. As illustrated, rig 104 includes a derrick 154 with a rig floor 156 through which tubular 118 extends into wellbore 116. In some embodiments, rig 104 has a motor-driven winch and other associated equipment for extending tubular 118 into wellbore 116 to a selected depth. While the operating environment depicted in FIG. 1 refers to a stationary rig 104 for conveying tubular 118 having ball valve 122 within a land-based wellbore 116, in alternative embodiments, mobile workover rigs, wellbore servicing units (such as coiled tubing units), and the like are used to lower tubular 118 having ball valve 122 into wellbore 116. In some embodiments, a wellbore tubular 118 having ball valve 122 is used in other operational environments, such as within an offshore wellbore operational environment.

Figure 2:
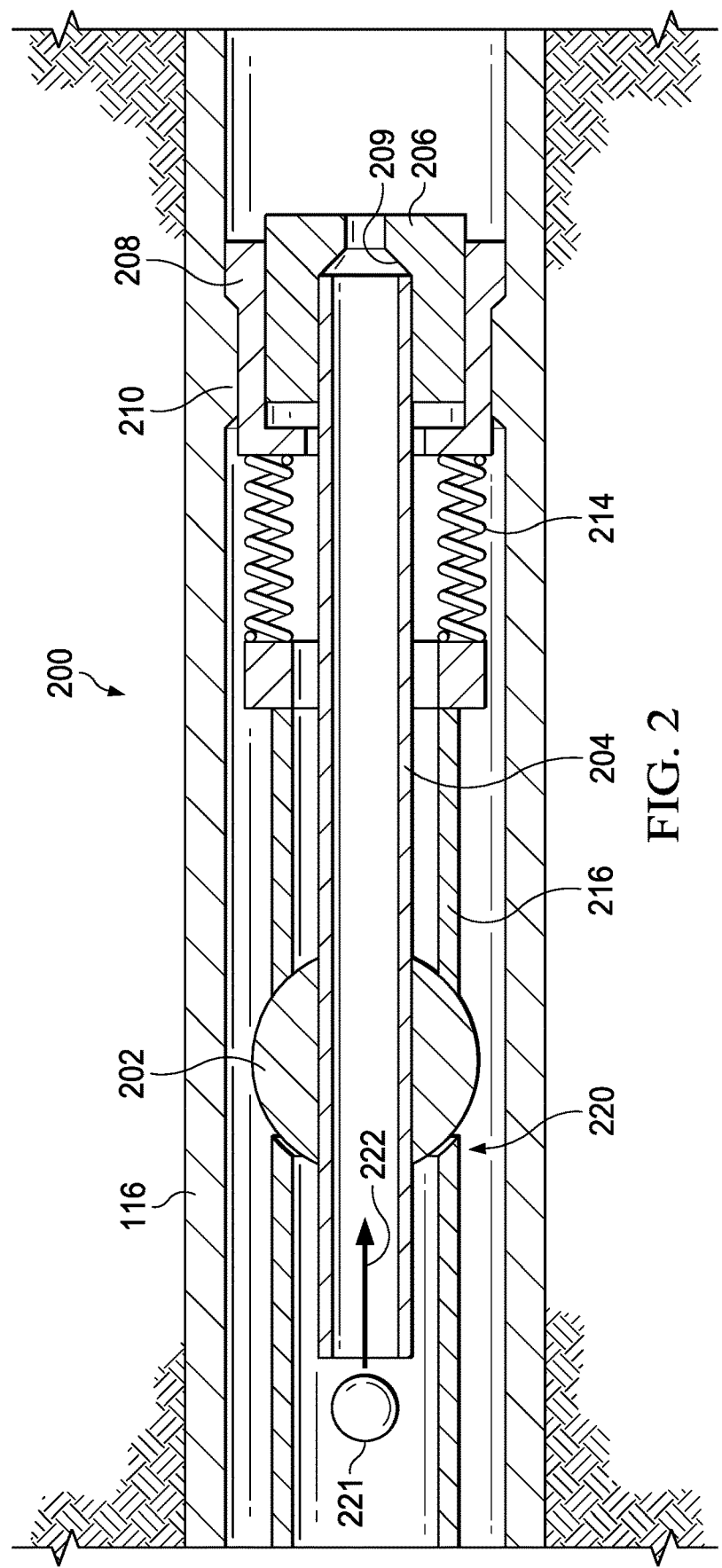
FIG. 2 is a schematic, cross-sectional view of a ball valve disposed in the environment illustrated in FIG. 1 and having a ball that is in an open position that allows fluid communication through the ball valve.
Figure 3:
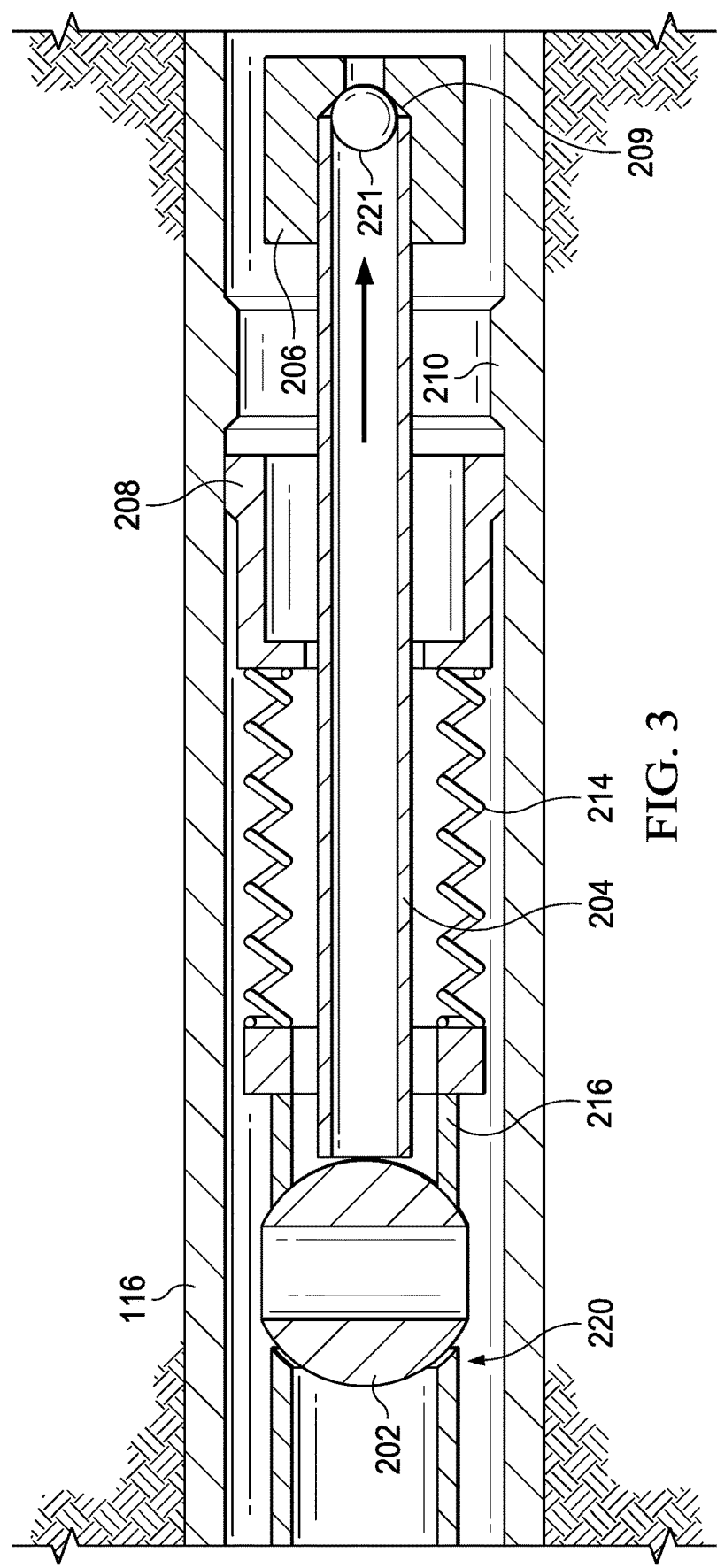
FIG. 3 is a schematic, cross-sectional view of the ball valve of FIG. 2 after the ball has rotated to a closed position that prevents fluid communication through the ball valve.

Ball valve 122 includes a valve housing, a shiftable sleeve, a ball rotatably movable from an open position to a closed position, and an actuation mechanism that rotates ball from the open position to the closed position to reduce or prevent fluid flow through ball valve 122. Additional illustrations of components of a ball valve similar to ball valve 122 of FIG. 1 are illustrated in FIGS. 2 and 3. Although FIG. 1 illustrates a single ball valve 122 disposed in wellbore 116, in some embodiments, multiple ball valves (not shown) are disposed along different zones of wellbore 116.

FIG. 2 is a schematic, cross-sectional view of a ball valve 200 disposed in the environment illustrated in FIG. 1 and having a ball 202 that is in an open position that allows fluid communication through ball valve 200. Ball valve 200 is deployable in multiple well environments, such as, but not limited to, stimulation, completion, and production environments that utilize a valve to restrict fluid flow. In the embodiment of FIG. 2, ball valve 200 is deployed in wellbore 116 of FIG. 1. Ball valve 200 has a ball 202 that is coupled to a valve housing 204. Valve housing 204 has a hollow interior that provides a fluid passage through valve housing 204. Ball 202 also has a hollow interior that is aligned with the hollow interior of valve housing 204 to permit fluid flow through ball valve 200. Ball 202 is rotatable (such as 90°) from the alignment illustrated in FIG. 2 to prevent fluid flow through ball valve 200. In that regard, ball 202 is in an open position when the alignment of ball 202, with respect to ball valve 200, permits fluid flow through ball valve 200, whereas ball 202 is in a closed position when the alignment of ball 202 (or the fluid passageway of ball 200) with respect to ball valve 200 (or the fluid passageway of ball valve 202) restricts fluid flow through ball valve 200. Ball valve 200 also includes a ball seat 220. In the embodiment of FIG. 2, after ball 202 is rotated (such as to the position illustrated in FIG. 3), surfaces of ball 202 and ball seat 220 form a seal that prevents fluid flow through ball valve 200.

Ball valve 200 also includes a sleeve 206 that is disposed in and/or is slidably coupled to valve housing 204. Sleeve 206 is shiftable from the first position illustrated in FIG. 2 to a second position, such as the position illustrated in FIG. 3. Sleeve 206 is coupled to or includes a diverter seat 209 that is configured to retain a diverter flowing downhole and prevent the diverter from flowing through sleeve 206. In the embodiment of FIG. 2, diverter seat 209 is a ball seat, and is configured to retain an activation ball 221 that is flowing downhole in the direction illustrated by arrow 222. In some embodiments, diverter seat 209 is formed by a tapered profile of sleeve 206, which allows the diverter to flow into sleeve 206, but prevents the diverter from flowing out of sleeve 206. In some embodiments, sleeve 206 also includes a shearable piece that is configured to shear in response to a threshold amount of pressure (such as 100 psi, 1,000 psi, or another amount of pressure) applied to sleeve 206. Examples of the shearable piece include, but are not limited to, shear pins, shear-rings, and other types of members or components that are configured to shear or break off in response to a threshold amount of pressure applied to sleeve 206. In some embodiments, sleeve 206 also includes a collapsible member that is configured to collapse in response to a threshold amount of pressure applied to sleeve 206. Examples of the collapsible member include, but are not limited to, collets, gauges, collapsible rings, as well as other types of members or components that are configured to collapse in response to a threshold amount of pressure applied to sleeve 206.

Ball valve 200 also includes a latch 208 that is initially engaged to a latch retainer 210. Further, ball valve 200 also includes a spring 214 that is coupled to latch 208 and an arm 216, which is engaged with ball 202. In the embodiment of FIG. 2, spring 214 and arm 216 are components of an actuation mechanism to actuate ball 202. Additional descriptions of the actuation mechanism are provided herein.

In that regard, FIG. 3 is a schematic, cross-sectional view of ball valve 200 of FIG. 2 after ball 202 has rotated to a closed position that prevents fluid communication through ball valve 200. More particularly, in the embodiment of FIG. 3, force generated by activation ball 221 landing on sleeve 206 shears the shearable piece of sleeve 206 and shifts sleeve 206 from the position illustrated in FIG. 2 downhole to the position illustrated in FIG. 3. The shifting of sleeve 206 from the position illustrated in FIG. 2 disengages latch 208 from latch retainer 210. In some embodiments, spring 214 is trapped between valve housing 204 and arm 216 such that a spring force (such as release of potential energy stored in spring 214 as spring 214 returns from a compressed state to a natural state) moves arm 216 towards ball 202. However, spring 214 remains in the compressed state while latch 208 is held in place between sleeve 206 and latch retainer 210 (as shown in FIG. 2). After activation ball 221 lands on diverter seat 209, pressure applied by activation ball 221 to sleeve 206 shears a shearable piece (such as shear pins) or collapses a collapsible member (such as a collet) that initially held sleeve 206 in the first position as illustrated in FIG. 2, thereby allowing sleeve 206 to shift downhole to the position illustrated in FIG. 3. The shifting of sleeve 206 downhole from the location of latch 208 disengages latch 208 from latch retainer 210, thereby allowing spring 214 to return to a natural state. Force generated by spring 214 returning to a natural state moves arm 216, spring 214, and latch 208 uphole. Moreover, arm 216 is connected to or coupled to ball 202 such that movement of arm 216 uphole rotates ball 202 from the open position illustrated in FIG. 2 to the closed position illustrated in FIG. 3. In the embodiments of FIGS. 2 and 3, latch 208 is coupled to spring 214, which is initially in a compressed state while latch 208 is engaged to latch retainer 210 as illustrated in FIG. 2. After latch 208 is disengaged from latch retainer 210, spring 214 returns to a natural state, and potential energy released by spring 214 returning to a natural state drives arm 216, which in turn rotates ball 202 from the open position illustrated in FIG. 2 to the closed position illustrated in FIG. 3. In the embodiment of FIG. 3, ball 202 has been rotated approximately 90° from the position of ball 202 in FIG. 2. More particularly, the flow passage through ball 202 is approximately perpendicular to the flow passage through valve housing 204, thereby restricting fluid flow through ball valve 200. Further, the surfaces of ball 202 and ball seat 220 together form a fluid seal that restricts fluids from flowing downhole into valve housing 204.

In some embodiments, ball valve 200 remains permanently closed after ball 202 rotates from the open position illustrated in FIG. 2 to the closed position illustrated in FIG. 3. In some embodiments, after ball 202 rotates to the closed position, ball 202 is rotatable from the closed position back to the open position illustrated in FIG. 2 by external means, or to another position that permits fluid flow through ball valve 200. In some embodiments, a ball 202 is configured to rotate from the closed position to the open position in response to a threshold amount of pressure applied to ball 202 or to another component of ball valve 200.

Although FIGS. 2-3 illustrate sleeve 206, latch 208, latch retainer 210, spring 214, and arm 216 as being disposed downhole from ball 202, in some embodiments, sleeve 206, latch 208, latch retainer 210, spring 214, and arm 216 are disposed uphole from ball 202. In one or more of such embodiments, a diverter landing on a diverter seat 209 of sleeve 206 shifts sleeve 206 downhole (or in another direction), and the shifting of sleeve 206 disengages latch 208, which initially holds spring 214 in a compressed state from latch retainer 210. After latch 208 is disengaged from latch retainer 210, spring 214 returns to a natural state, and potential energy released from spring 214 returning to a natural state drives arm 216 to rotate ball 202 to a closed position (such as the position illustrated in FIG. 3), thereby preventing fluid flow into the fluid passage of ball 202. In one or more of such embodiments, ball 202 is coupled to a diverter seat disposed downhole from ball 202. Further, the surfaces of ball 202 while ball 202 is in the closed position and diverter seat form a fluid seal that prevents fluids from flowing through ball valve 200 (downhole of ball 202).

Although FIGS. 2-3 illustrate a latch 208, in some embodiments, spring 214 and arm 216 are initially held in the position illustrated in FIG. 2 by a retaining mechanism such as a snap ring, a collet, a shear screw, or another member or device configured to initially prevent spring 214 from returning to the natural state while sleeve 206 is in the first position. The shifting of sleeve 206 shifts towards the second position, the retaining mechanism disengages the retaining mechanism (such as snapping a snap ring, un-collapsing a collet, collapsing a collet, shearing a screw) that initially prevented spring 214 from returning to the natural position. In some embodiments, sleeve 206 is not disposed within housing 204 but is nonetheless slidably coupled to housing 204 to slide from a first position to a second position.

Although FIGS. 2-3 illustrate a latch 208 initially engaged to a latch retainer 210, in some embodiments, a latch and a latch retainer are not present in ball valve 200 to prevent a compressed spring such as spring 214 from returning to a natural state. However, sleeve 206 is configured to prevent rotation of ball 202 from an open position to a closed position while sleeve is in a first position. In one or more of such embodiments, sleeve 206 is initially disposed in or partially disposed in the flow passage way of ball 202 such that ball 202 is prevented from rotating from the open position to the closed position. Moreover, as sleeve 206 prevents ball 202 from rotating it also prevents spring 214 from returning to the natural state while sleeve 206 is held in the initial position. After a diverter, such as activation ball 221 is pumped into wellbore 116, force generated by landing of activation ball 221 shifts sleeve 206 to a second position (such as to a location downhole of ball 202), thereby no longer preventing rotation of ball 202. After sleeve 206 shifts to the second position, force generated by spring 214 returning to the natural state moves arm 216, which in turn rotates ball 202 from the open position to the closed position. Further, although FIGS. 2-3 illustrate ball 202 rotating approximately 90°, in some embodiments, ball 202 is rotated a different number of degrees to prevent fluid flow through ball valve 200.

Although FIGS. 2-3 illustrate an actuation mechanism having spring 214 and arm 216, in some embodiments, the actuation mechanism includes multiple springs coupled to multiple arms. In some embodiments, the actuation mechanism does not include any spring. In one or more of such embodiments, the actuation mechanism includes a compressed gas, which, when the latch is released, expands causing the arm 216 to move to rotate the ball 202 from the position illustrated in FIG. 2 to the position illustrated in FIG. 3. In one or more of such embodiments, the actuation mechanism includes an atmospheric chamber which, when the latch is released, the hydrostatic pressure naturally present in the well will act on the atmospheric chamber to compress the volume of the atmospheric chamber. In one or more of such embodiments, a ball valve includes two volumes, one filled by a first fluid (such as a gas) at atmospheric pressure, and a second volume of atmospheric pressure fill by a second fluid (such as grease). When a latch is released, hydrostatic pressure acts on a piston (such as to push the piston to the right or to another direction) to compress the second volume. The fluid in the second volume (such as grease) is squeezed through small holes in a mandrel into the first volume, thereby filling (or partially filling) the first volume with the second fluid and compressing the first fluid (such as a gas). A force (generated from the pressure differential between the well hydrostatic pressure and the atmospheric pressure acting over a piston) is applied by the compressed first fluid to an arm of the ball valve moves the arm, which in turn rotates a ball of the ball valve from an open position to a closed position.

Figure 4:
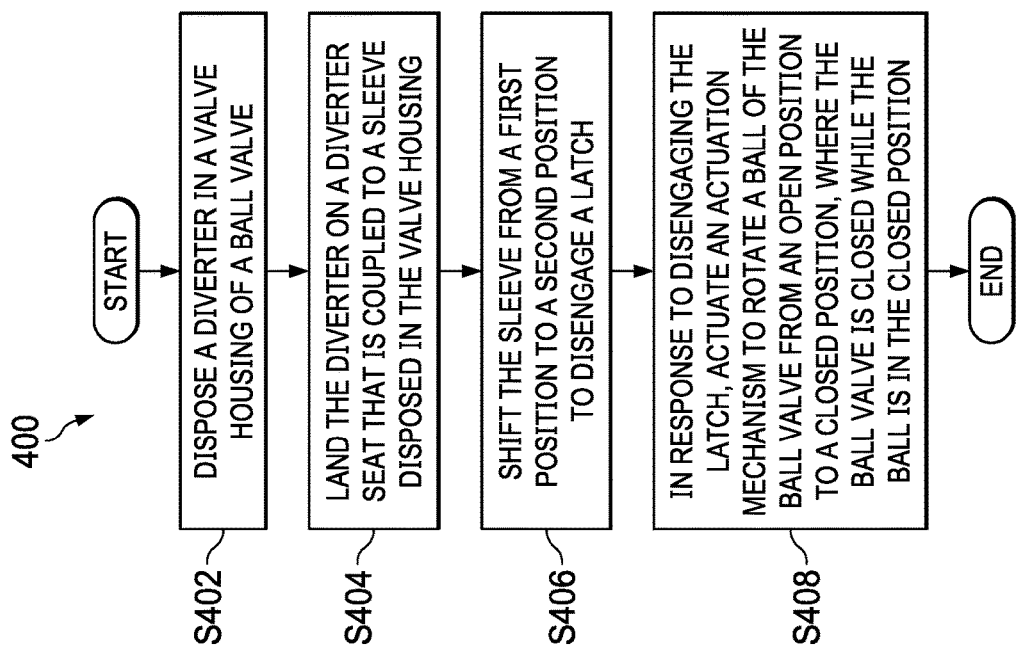
FIG. 4 illustrates a process to close a ball valve.

FIG. 4 illustrates a process 400 to close a ball valve, such as ball valve 200 of FIGS. 2-3. Although the operations in the process 400 are shown in a particular sequence, certain operations may be performed in different sequences or at the same time where feasible.

At block S402, a diverter is disposed in a valve housing of a ball valve. FIG. 2, for example, illustrates disposing an activation ball 221 downhole as indicated by arrow 222 into ball valve 200. Additional examples of diverters include, but are not limited to, darts, plugs, and other types of objects that are deployable in the valve housing. At block S404, the diverter lands on a diverter seat that is coupled to a sleeve disposed in the valve housing. FIG. 3, for example, illustrates landing activation ball 221 on diverter seat 209, which retains activation ball 221, and prevents activation ball 221 from flowing through diverter seat 209. The force or pressure applied by the diverter landing on the diverter seat shifts the sleeve. In some embodiments, the sleeve includes or is coupled to a shearable piece that initially causes movement of the sleeve until a threshold amount of pressure or forces is applied to the shearable piece or to the diverter seat. In one or more of such embodiments, the force or pressure generated by the diverter landing on the diverter seat shears the shearable piece, thereby permitting movement of the sleeve. At block S406, the sleeve is shifted from a first position to a second position to disengage a latch. FIGS. 2-3, for example, illustrate shifting sleeve 206 from the position illustrated in FIG. 2 to the position illustrated in FIG. 3 to disengage latch 208 from latch retainer 210. At block S408, and in response to disengaging the latch, an actuation mechanism is actuated to rotate a ball of the ball valve from an open position to a closed position, where the ball valve is closed while the ball is in the closed position. FIG. 3, for example, illustrates spring 214 returning to a natural state. Potential energy released by spring 214 returning to a natural state drives arm 216, which in turn rotates ball 202 from an open position illustrated in FIG. 2 to a closed position illustrated in FIG. 3. As shown in FIG. 3, ball valve 200 has been closed to prevent fluid flow through ball valve 200. In some embodiments, the ball valve also includes a ball seat that is coupled to or is positioned near the ball valve. Moreover, rotating the ball to the closed position forms a fluid seal along the surfaces of the ball seat and the ball, thereby reducing or restricting fluid flow through the ball.

Figure 5:
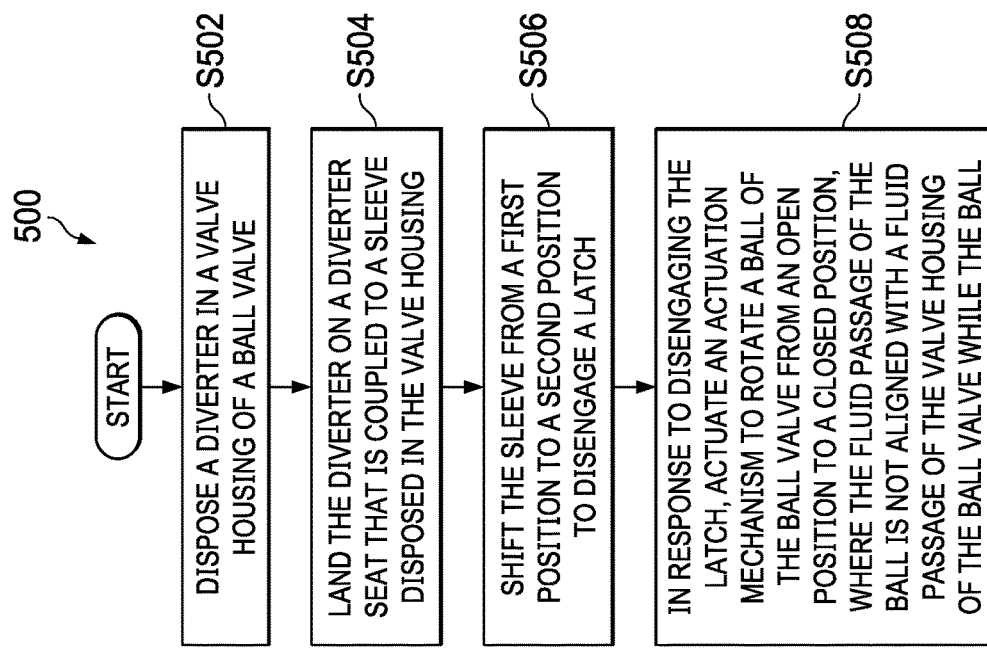
FIG. 5 illustrates a process to form a well barrier.

FIG. 5 illustrates a process to form a well barrier. Although the operations in the process 500 are shown in a particular sequence, certain operations may be performed in different sequences or at the same time where feasible.

At block S502, a diverter is disposed in a valve housing of a ball valve. FIG. 2, for example, illustrates disposing an activation ball 221 downhole as indicated by arrow 222 into ball valve 200. Additional examples of diverters include, but are not limited to, darts, plugs, and other types of objects that are deployable in the valve housing. At block S504, the diverter lands on a diverter seat that is coupled to a sleeve disposed in the valve housing. FIG. 3, for example, illustrates landing activation ball 221 on diverter seat 209, which retains activation ball 221, and prevents activation ball 221 from flowing through diverter seat 209. The force or pressure applied by the diverter landing on the diverter seat shifts the sleeve. In some embodiments, the sleeve includes or is coupled to a shearable piece that initially prevents movement of the sleeve until a threshold amount of pressure or force is applied to the shearable piece or to the diverter seat.

In one or more of such embodiments, the force or pressure generated by the diverter landing on the diverter seat shears the shearable piece, thereby permitting movement of the sleeve. At block S506, the sleeve is shifted from a first position to a second position to disengage a latch. FIGS. 2-3, for example, illustrate shifting sleeve 206 from the position illustrated in FIG. 2 to the position illustrated in FIG. 3 to disengage latch 208 from latch retainer 210. At block S508, and in response to disengaging the latch, an actuation mechanism is actuated to rotate a ball of the ball valve from an open position to a closed position, where the fluid passage of the ball is not aligned with a fluid passage of the valve housing of the ball valve while the ball is in the closed position. FIG. 3, for example illustrates spring 214 returning to a natural state. Potential energy released by spring 214 returning to a natural state drives arm 216, which in turn rotates ball 202 from an open position illustrated in FIG. 2 to a closed position illustrated in FIG. 3. As shown in FIG. 3, the fluid passage of ball 202, while ball 202 is in the closed position, does not align with the fluid passage of valve housing 204, thereby forming a well barrier that restricts fluid flow through valve 200. In some embodiments, the ball valve also includes a ball seat that is coupled to or is positioned near the ball valve. Moreover, rotating the ball to the closed position forms a fluid seal along the surfaces of the ball seat and the ball, thereby reducing or restricting fluid flow through the ball.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/processes may be performed in parallel or out of sequence, or combined into a single step/process. The scope of the claims is intended to broadly cover the disclosed embodiments and any such modification.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. The scope of the claims is intended to broadly cover the disclosed embodiments and any such modification. Further, the following clauses represent additional embodiments of the disclosure and should be considered within the scope of the disclosure:

Clause 1, a ball valve comprising a valve housing; a ball rotatably movable from an open position to a closed position; an actuation mechanism operable to rotate the ball from the open position to the closed position, wherein a fluid passage of the ball is not aligned with a fluid passage of the valve housing while the ball is in the closed position; and a sleeve disposed in the valve housing and operable to shift from a first position to a second position to actuate the actuation mechanism.

Clause 2, the ball valve of clause 1, wherein the actuation mechanism comprises a latch engaged to a latch retainer and configured to disengage from the latch retainer in response to the sleeve shifting to the second position; and a spring coupled to the latch and initially held in a first position, wherein the spring is configured to shift to a second position to rotate the ball to the closed position after the latch disengages from the latch retainer.

Clause 3, the ball valve of clause 2, wherein the actuation mechanism comprises an arm that is coupled to the ball and the spring, and wherein the arm is configured to rotate the ball from the open position to the closed position in response to the spring shifting to the second position.

Clause 4, the ball valve of clauses 2 or 3, wherein the spring is in a compressed state while in the first position, and wherein the spring is in a natural state while in the second position.

Clause 5, the ball valve of any of clauses 1-4, further comprising a retaining mechanism that is initially engaged to the actuation mechanism to prevent actuation of the actuation mechanism, wherein the retaining mechanism is disengaged from the actuation mechanism after the sleeve shifts to the second position.

Clause 6, the ball valve of clause 5, wherein the retaining mechanism comprises a snap ring, wherein the actuation mechanism comprises a spring initially held in a first position by the snap ring, and wherein the spring is configured to shift to a second position to rotate the ball to the closed position after the snap ring disengages the spring.

Clause 7, the ball valve of any clauses 1-6, further comprising a diverter seat disposed on the sleeve and configured to retain a diverter flowing through the ball valve, and wherein the sleeve is configured to shift from the first position to the second position in response to receiving the diverter.

Clause 8, the ball valve of clause 7, wherein the diverter seat is a ball seat configured to retain an activation ball.

Clause 9, the ball valve of clause 8, wherein the sleeve comprises a shearable piece configured to shear in response to a threshold amount of pressure applied to the sleeve.

Clause 10, the ball valve of clauses 8 or 9, wherein the sleeve comprises a collet configured to collapse in response to a threshold amount of pressure applied to the sleeve, and wherein the sleeve is configured to shift to the second position after the collet collapses.

Clause 11, the ball valve of any of clauses 1-10, further comprising a ball seat, wherein a fluid seal is formed by the ball along the ball seat after the ball rotates to the closed position.

Clause 12, the ball valve of any of clauses 1-11, wherein the sleeve prevents the ball from rotating from the open position to the closed position while the sleeve is in the first position.

Clause 13, a method to close a ball valve, the method comprising disposing a diverter in a valve housing of a ball valve; landing the diverter on a diverter seat that is coupled to a sleeve disposed in the valve housing; shifting the sleeve from a first position to a second position to disengage a latch of the ball valve; and in response to disengaging the latch, actuating an actuation mechanism of the ball valve to rotate a ball of the ball valve from an open position to a closed position, wherein the ball valve is closed while the ball is in the closed position.

Clause 14, the method of clause 13, wherein the actuation mechanism comprises a spring and an arm that is coupled to the ball, and wherein actuating the actuation mechanism comprises applying a spring force from the spring to the arm; and moving the arm from a first position to a second position to rotate the ball from the open position to the closed position.

Clause 15, the method of clauses 13 or 14, wherein the ball valve comprises a shearable piece that prevents movement of the sleeve, the method further comprising applying a threshold amount of force to shear the shearable piece, wherein the sleeve shifts from the first position to the second position after the threshold amount of force is applied to the shearable piece.

Clause 16, the method of any of clauses 13-15, further comprising forming a fluid seal with a surface of the ball and a surface of a ball seat disposed in the ball valve.

Clause 17, a method to form a well barrier, the method comprising disposing a diverter in a valve housing of a ball valve, the ball valve comprising a ball having a fluid passage through the ball; landing the diverter on a diverter seat that is coupled to a sleeve disposed in the valve housing; shifting the sleeve from a first position to a second position to disengage a latch of the ball valve; and in response to disengaging the latch, actuating an actuation mechanism of the ball valve to rotate a ball of the ball valve from an open position to a closed position, wherein the fluid passage of the ball is not aligned with a fluid passage of the valve housing of the ball valve while the ball is in the second position.

Clause 18, the method of clause 17, wherein the actuation mechanism comprises a spring and an arm that is coupled to the ball, and wherein actuating the actuation mechanism comprises: applying a spring force from the spring to the arm; and moving the arm from a first position to a second position to rotate the ball from the open position to the closed position.

Clause 19, the method of clauses 17 or 18, wherein the ball valve comprises a shearable piece that prevents movement of the sleeve, the method further comprising applying a threshold amount of force to shear the shearable piece, wherein the sleeve shifts from the first position to the second position after the threshold amount of force is applied to the shearable piece.

Clause 20, the method of any of clauses 17-20, further comprising forming a fluid seal with a surface of the ball and a surface of a ball seat disposed in the ball valve.

As used herein, the singular forms "a," "an," and "the" are intended to include the plural forms as well, unless the context clearly indicates otherwise. It will be further understood that the terms "comprise" and/or "comprising," when used in this specification and/or in the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

What is claimed is:
1. A ball valve comprising:
a valve housing;
a ball rotatably movable from an open position to a closed position;
an actuation mechanism operable to rotate the ball from the open position to the closed position, wherein a fluid passage of the ball is not aligned with a fluid passage of the valve housing while the ball is in the closed position; and
a sleeve disposed in the valve housing and operable to shift from a first position to a second position to actuate the actuation mechanism,
wherein the sleeve remains slidably coupled to the valve housing after the sleeve shifts to the second position; and a retaining mechanism that is initially engaged to the actuation mechanism to prevent actuation of the actuation mechanism, wherein the retaining mechanism is disengaged from the actuation mechanism after the sleeve shifts to the second position.

2. The ball valve of claim 1, wherein the actuation mechanism comprises:
a latch engaged to a latch retainer and configured to disengage from the latch retainer in response to the sleeve shifting to the second position; and
a spring coupled to the latch and initially held in a first position, wherein the spring is configured to shift to a second position to rotate the ball to the closed position after the latch disengages from the latch retainer.

3. The ball valve of claim 2, wherein the actuation mechanism comprises an arm that is coupled to the ball and the spring, and wherein the arm is configured to rotate the ball from the open position to the closed position in response to the spring shifting to the second position.

4. The ball valve of claim 2, wherein the spring is in a compressed state while in the first position, and wherein the spring is in a natural state while in the second position.

5. The ball valve of claim 1, wherein the retaining mechanism comprises a snap ring, wherein the actuation mechanism comprises a spring initially held in a first position by the snap ring, and wherein the spring is configured to shift to a second position to rotate the ball to the closed position after the snap ring disengages the spring.

6. The ball valve of claim 1, further comprising a diverter seat disposed on the sleeve and configured to retain a diverter flowing through the ball valve, and wherein the sleeve is configured to shift from the first position to the second position in response to receiving the diverter.

7. The ball valve of claim 6, wherein the diverter seat is a ball seat configured to retain an activation ball.

8. The ball valve of claim 7, wherein the sleeve comprises a shearable piece configured to shear in response to a threshold amount of pressure applied to the sleeve.

9. The ball valve of claim 7, wherein the sleeve comprises a collet configured to collapse in response to a threshold amount of pressure applied to the sleeve, and wherein the sleeve is configured to shift to the second position after the collet collapses.

10. The ball valve of claim 1, further comprising a ball seat, wherein a fluid seal is formed by the ball along the ball seat after the ball rotates to the closed position.

11. The ball valve of claim 1, wherein the sleeve prevents the ball from rotating from the open position to the closed position while the sleeve is in the first position.

12. A method to close a ball valve, the method comprising:
disposing a diverter in a valve housing of a ball valve;
landing the diverter on a diverter seat that is coupled to a sleeve disposed in the valve housing;
shifting the sleeve from a first position to a second position to disengage a latch of the ball valve, wherein the sleeve remains slidably coupled to the valve housing after the sleeve shifts to the second position; and
in response to disengaging the latch, actuating an actuation mechanism of the ball valve to rotate a ball of the ball valve from an open position to a closed position, wherein the ball valve is closed while the ball is in the closed position.

13. The method of claim 12, wherein the actuation mechanism comprises a spring and an arm that is coupled to the ball, and wherein actuating the actuation mechanism comprises:
applying a spring force from the spring to the arm; and
moving the arm from a first position to a second position to rotate the ball from the open position to the closed position.

14. The method of claim 12, wherein the ball valve comprises a shearable piece that prevents movement of the sleeve, the method further comprising applying a threshold amount of force to shear the shearable piece, wherein the sleeve shifts from the first position to the second position after the threshold amount of force is applied to the shearable piece.

15. The method of claim 12, further comprising forming a fluid seal with a surface of the ball and a surface of a ball seat disposed in the ball valve.

16. A method to form a well barrier, the method comprising:
disposing a diverter in a valve housing of a ball valve, the ball valve comprising a ball having a fluid passage through the ball;
landing the diverter on a diverter seat that is coupled to a sleeve disposed in the valve housing;
shifting the sleeve from a first position to a second position to disengage a latch of the ball valve, wherein the sleeve remains slidably coupled to the valve housing after the sleeve shifts to the second position; and
in response to disengaging the latch, actuating an actuation mechanism of the ball valve to rotate a ball of the ball valve from an open position to a closed position, wherein the fluid passage of the ball is not aligned with a fluid passage of the valve housing of the ball valve while the ball is in the closed position.

17. The method of claim 16, wherein the actuation mechanism comprises a spring and an arm that is coupled to the ball, and wherein actuating the actuation mechanism comprises:
applying a spring force from the spring to the arm; and
moving the arm from a first position to a second position to rotate the ball from the open position to the closed position.

18. The method of claim 16, wherein the ball valve comprises a shearable piece that prevents movement of the sleeve, the method further comprising applying a threshold amount of force to shear the shearable piece, wherein the sleeve shifts from the first position to the second position after the threshold amount of force is applied to the shearable piece.

19. The method of claim 16, further comprising forming a fluid seal with a surface of the ball and a surface of a ball seat disposed in the ball valve.

* * * * *